June 19, 1956          H. COLOMB          2,750,731
STATIONARY BEARING, INCLUDING AN END-STONE
FOR PIVOTS, CHIEFLY CLOCKWORK PIVOTS
Filed Oct. 15, 1953          2 Sheets-Sheet 1

June 19, 1956    H. COLOMB    2,750,731
STATIONARY BEARING, INCLUDING AN END-STONE
FOR PIVOTS, CHIEFLY CLOCKWORK PIVOTS
Filed Oct. 15, 1953    2 Sheets-Sheet 2

United States Patent Office 2,750,731
Patented June 19, 1956

2,750,731

STATIONARY BEARING, INCLUDING AN END-STONE FOR PIVOTS, CHIEFLY CLOCKWORK PIVOTS

Henri Colomb, Prilly, Switzerland

Application October 15, 1953, Serial No. 386,291

Claims priority, application Switzerland October 17, 1952

12 Claims. (Cl. 58—140)

My invention has for its object improvements in bearings including an end-stone, for pivots, chiefly for clockwork pivots, such bearings including a perforated section through which the pivot extends and a section forming an abutment for the tip of said pivot, said sections being mounted coaxially in the bearing support which is secured in its turn to one of the parts of the structure carrying the clockwork.

According to my invention, said bearing includes a yielding flange or annulus provided with two outer diametrically opposed projections, said flange or annulus being located heightwise in a position such that it registers at the level of its outer projections with the wall of a coaxial recess formed in the bearing support, while the opposite inner edge of said flange presses axially through the agency of two inner arcuate diametrically opposed projections on the abutment section of the bearing. Said inner projections are rigid at least in an axial direction with said abutment section when they are held in position by corresponding concentric radially extending abutment surfaces formed on the support, which latter is provided with two diametrically opposed openings wherethrough the outer projections of the flange may be engaged over the said abutment surfaces upon pressure being exerted on the flange while the latter is caused to rotate when thus stretched and incurved; the inner surface of the flange except for the two short inner projections acting on the section of the bearing serving as an abutment, is sized in a manner such that the corresponding portion of the flange cannot engage the abutment section, and the diameter of at least one outer projection of the flange and that of the flange at the level of said projections are such with reference respectively to the opening in which the bearing support is mounted inside the cooperating part of the clockwork-carrying structure and to the recess in said support that the flange is fitted in said opening and recess with a very small clearance.

I have illustrated by way of example in the accompanying drawings various embodiments of a bearing executed in accordance with my invention. In said drawings.

Figure 1:
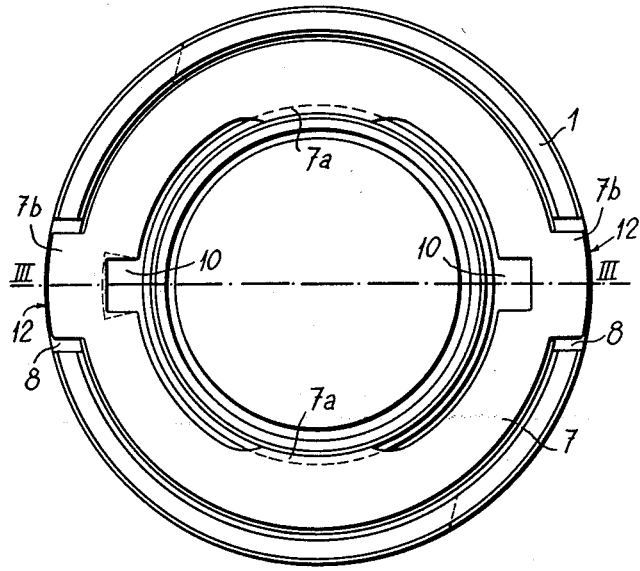
Fig. 1 is a plan view of a first embodiment of the bearing.
Figure 2:
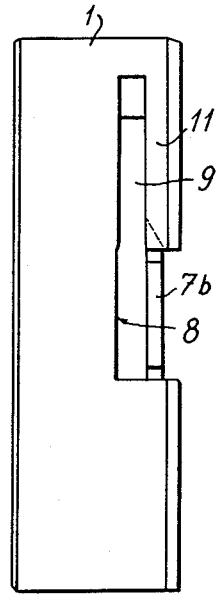
Fig. 2 is a side view of said bearing.
Figure 3:
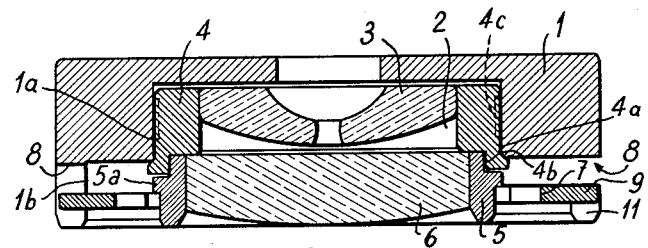
Fig. 3 is a cross-section through line III—III of Fig. 1.
Figure 10:
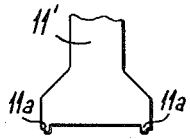
Fig. 10 is an elevational view of a tool that may be used for the insertion of the flange and Fig. 11 is a view from underneath said tool.
Figure 11:
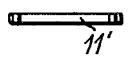

The bearing illustrated in Figs. 1 to 3 is intended to carry the lower pivot of the balance staff of a clockwork on the dial side; said bearing includes a cylindrical support 1 for the bearing body comprising a bezel 4 in the central opening of which is fitted the perforated so-called through-stone 3 and a second bezel 5 rigid with the counter-pivot or end-stone 6. Said bezel 5, which is housed with a loose fit through a part of its height of reduced diameter inside an annular recess 4a provided in the inner surface of the bezel 4 carrying the through-stone 3, forms with the end-stone 6 the section of the body of the bearing acting as an abutment for the end of the staff pivot. Thus, the two sections of the bearing body form a system that is independent of the bearing support, while said sections may be separated from each other only in an axial direction. Said system is held centrally inside a coaxial recess 1a formed in the bearing support 1 by the upper smaller diameter end of the through-stone and bezel arrangement 3—4, which latter is fitted with a very small clearance inside said coaxial recess 1a, the centering being furthered by the frustoconical surface 4b formed on a flange of the bezel 4, said surface engaging the slightly bevelled edge formed on the support between the recess 1a and the recess 1b housing the bezel 5 and the flange on the bezel 4. A coaxial clearance 4c illustrated in dotted lines may be provided round the bezel 4 so as to allow an easy fitting, as mentioned, of said bezel inside the recess 1a of the support by means of an arrangement, associated with means maintaining the diameter of its upper edge when the through-stone 3 is driven into said bezel. The system of two bezels forming the bearing body is secured inside the bearing support by means of an elastic metal annulus or flange 7 assuming the shape of a ring and assembled rigidly with the bezel 5 by means of two short diametrically opposed arcuate inner projections 7a, termed hereinafter pressure-exerting projections, and engaging the bearing surface of a collar 5a formed on said bezel. The two intermediate portions of the flange provided with outer diametrically opposed projections 7b surround the bezel 5 with some clearance. For executing such an arrangement, there are provided in the support 1 of the bearing, two diametrically opposed openings 8 communicating with the bottom of the recess 1b and extending into transverse cuts 9 formed in the wall of the support, starting from the outside of the latter and defining arcuate tongues 11 extending in opposite diametrical relationship. The length of said tongues, as shown in Fig. 1, is limited by a dotted line corresponding to the short slightly concave wall shown in Fig. 2. The upper surfaces of said tongues serve as bearings for the outer projections 7b on the flange 7 when the latter is used for securing the bearing body to the support; to this end, said projections 7b being positioned already inside the openings 8 of the support 1, it is sufficient to engage for instance the two sharp ends of pick pincers inside the inner diametrically opposed notches 10 formed in the flange in register with the axis of the outer projections 7b and then to apply pressure so as to bend and stretch the two corresponding flange portions away from the bezel of the end-stone, after which, said outer projections 7b are caused to engage through a rotary clockwise motion the transverse passages 9 in the support 1, whereby they move over the tongue 11 where said projections may be held fast by the upper surface of said tongues; thus, by reason of the elastic reaction developed by the flange, the bearing body is rigidly secured. Perforations may obviously be provided instead of said notches 10. In order to prevent the flange from urging the bearing body out of center, the periphery 12 of its outer projections assumes substantially the same diameter as the cylindrical opening in the plate carrying the clockwork, said periphery engaging with a force fit said cylindrical opening which is finished over a die with an allowance of two microns. Furthermore, it should be remarked that, for the same purpose, the flange is positioned heightwise so that its outer periphery at the level of the outer projections may register with the wall of the coaxial recess 1b of the support with only a slight clearance therebetween. This manner of resorting to narrow arcuate tongues for carrying the outer projections of the flange is a novel feature and solves a difficult problem because it was essential to retain the same large stones for the two bearings of the balance staff of the clockwork of wrist watches, while the flange should not only engage the section of the bearing which forms an abutment but should also be sized in accordance with the cylindrical support to be associated with the plate carrying the clockwork with a view to providing the same flange for both supports. When resorting in the usual manner to the surface of a coaxial recess formed in a cylindrical support for holding the outer projections of the securing flange, there is no room left between the bezel of the end-stone and the wall of the recess in the support and consequently, it is impossible to give the flange a sufficient breadth. The flange may also be fitted by means of the simple flat tool 11' illustrated in Figs. 10 and 11 and provided with two projections 11a the shape of which is such that they may engage partly one of the inner notches 10 in the flange while the outer surfaces perpendicular to the axis of the tool, which limit the operative length of said notch-engaging projections exert a pressure on the flange surface. Such a tool which is simply cut from a thin sheet by means of a die may be inserted in an ordinary screw-driver. To make the mounting easier, it is possible to machine a sloping plane in the tongues 11 of the support as illustrated by dotted lines in Fig. 2, or else the passage-ways 9 formed in the support are cut obliquely so that the surfaces of the tongues bearing on the outer projections of the flange may be slanting. The bottom of the support is provided with a central bore which is slightly smaller than the recess in the through-stone whereby it is possible to guide the pivot of the spindle and to make it engage automatically the through-stone; thus, its mounting is made easier and the end of the pivot is not damaged because it never engages the flat surface of the through-stone and does not soil the latter with the oil it may carry.

It should be remarked that I have described the arrangement of Figs. 1 to 3 as if it were positioned as shown, i. e. as the lower bearing for a balance staff pivot.

Figure 4:
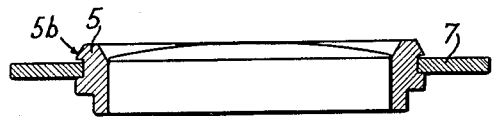
Fig. 4 is an elevational, partly sectional view of a modification of the section of the bearing which serves as an abutment for the end of the pivot.

In the modification illustrated in Fig. 4, the section of the bearing body forming an abutment for the end of the pivot differs from that shown in Fig. 3 only as far as its bezel 5 and the manner of securing the flange therein are concerned. Said bezel 5 is outwardly provided with a groove having a rectangular cross-section the breadth of which is larger than the thickness of the flange, inside which groove the two above-mentioned pressure-exerting inner projections are fitted. The flange and bezel being rigid with each other at least in the axial direction, their assembly may be effected for instance by introducing inside the groove one of said projections, while the other rests against the bezel surface 5b of the bezel, whereby it is possible to make the last mentioned projection of the flange snap into the groove by merely exerting pressure on the flange which yields elastically. Thus the flange may be assembled with the bezel at least in the axial direction without any drawback arising therethrough.

Figure 5:
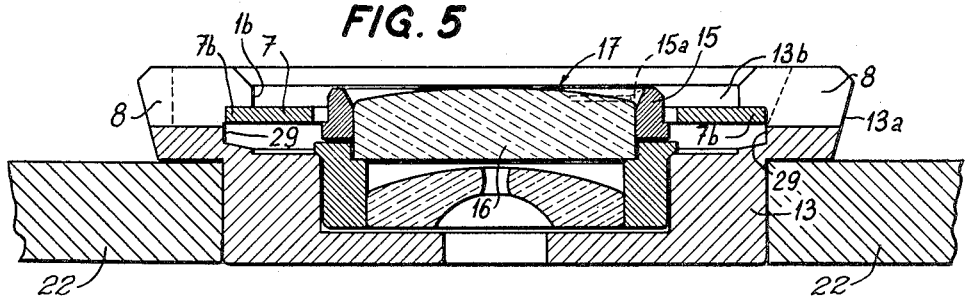
Fig. 5 is a cross-section similar to that of Fig. 3 of a second embodiment of the bearing.
Figures 6, 7:
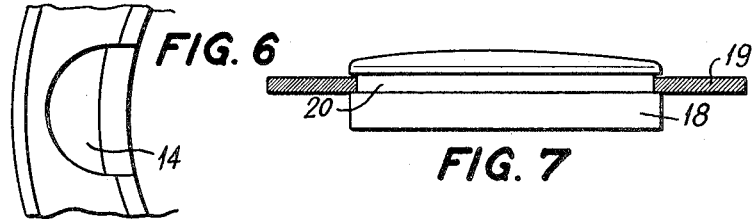
Fig. 6 is a plan view of a detail of said second embodiment.
Fig. 7 is an elevational, partly sectional view of a detail modification.

In the embodiment illustrated in Figs. 5 and 6, the support, the lower part of which is designated by the reference number 13, is also cylindrical and assumes the same diameter as in the first embodiment; said support is urged into a corresponding opening in the balance-covering plate 22 of the clockwork while its upper part 13a assuming a larger diameter and bounded by a frustoconical surface forms a small plate carrying the regulating means. The diametrically opposed openings 8 allow the mounting of the flange 7 in the manner disclosed hereinabove, but they are cut in the present case through a height registering with the annulus formed in said small plate by the recess 13b provided for the housing of the body of the flange 7. The surfaces of the tongues 11, which form bearings for the outer diametrically opposed projections 7b of the flange are replaced by the surface of a groove 29 coaxial with the support, which surface may be slightly frustoconical, as shown in dotted lines. Fig. 6 shows one of the openings 14 extending into said groove, which opening does not pass through the annular wall of the suport, and is made by means of a cylindrical cutter; its wall is shown in dotted lines at the left hand side of Fig. 5 while at the right hand side is shown an opening the wall of which is frustoconical and opens into a circular opening. When said groove 29 in the support, which should be large enough to receive the same flange as that defined by the opening for the support, is located nearer the section 13, it is necessary to replace it by two short diametrically opposed grooves that are cut when the openings 8 are being formed. By reason of the difficulty of obtaining, in mass production, an accurate diameter for said groove 29 or for the above mentioned short grooves, I resort preferably to the wall of the recess 1b in the support for association with the periphery of the flange so that the slight possible eccentricity of the latter may have no objectionable action on the body of the bearing. The body of the bearing differs from that described with reference to the first embodiment solely through the section forming an abutment for the end of the pivot. Its bezel 15 is shorter so that the end-stone 16 housed in a corresponding recess formed in the through-stone bezel may hold together in a radial direction the two sections of the bearing body; however, the bezel part engaging the same type of flange 7 is shaped in the same manner as described above. The bezel 15 for the end-stone 16 may be provided as illustrated in dotted lines with an inner flange 15a against which the outer surface 17 of the end-stone bears, whereby said end-stone enters a well defined location.

In the modification illustrated in Fig. 7, the end-stone 18 is no longer held inside a bezel and it is provided with a groove of rectangular cross-section which is slightly broader than the thickness of the flange 19, the two pressure-exerting inner projections of which are fitted inside said groove and made rigid at least in an axial direction with the end-stone in the manner already disclosed with reference to Fig. 4.

Figure 8:
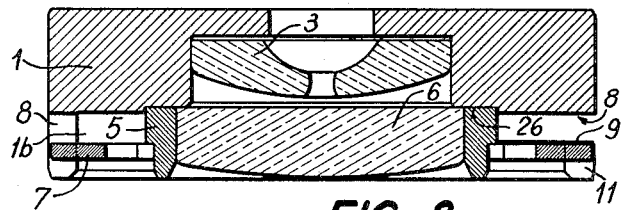
Fig. 8 is a cross-section, similar to that of Fig. 3, of a third embodiment.

In the embodiment illustrated in Fig. 8, the through-stone 3 is urged directly inside the cylindrical support 1 of the bearing, the diameter of which, as well as the recess 1b, the diametrically opposed openings 8 and the transverse passageways 9 therein defining the arcuate tongues 11 are similar to what has been disclosed with reference to the first embodiment. This allows mounting on the support the abutment section of the bearing for the tip of the pivot in a manner similar to that illustrated in Fig. 3, with the same flange and in the same manner as that resorted to for securing to the support the sections of the bearing body in the first embodiment. The bezel 5 with its end-stone 6 is held fast against the bottom 26 of a shallow recess formed coaxially in the support. This shallow recess may be done away with without any drawback arising therethrough because the flange provides a sufficient centering of the end-stone.

For the reasons already given hereinabove, I have provided again a central bore in the support but obviously it is possible to drive the through-stone 3 directly into an opening of the support, which is substituted for the recess therein so that said recess is no longer necessary.

Figure 9:
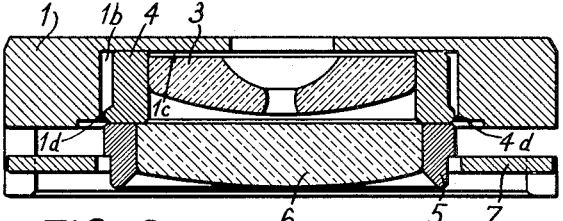
Fig. 9 is also a cross-section, similar to that of Fig. 3, of a fourth embodiment.

In the fourth embodiment illustrated in Fig. 9, the through-stone of the third embodiment (Fig. 8) is replaced by a system including a bezel 4 and a through-stone 3 housed removably inside a central recess 1b of the bearing support 1; the bezel bears against the bottom 1c of said recess and it is held centrally therein by the outer surface 4d of a collar formed on the bezel 4, said surface fitting, with a clearance reduced to a minimum, the short surface of an inner projection 1d formed along the outer edge of the recess in the support. Said support assumes a shape similar to that of the support shown in Fig. 8 so that the flange 7 engaging the system including the bezel 5 and the end-stone 6, which are both similar to the corresponding parts shown in Fig. 8, may urge through its bezel 5 the bezel of the through-stone against the bottom 1c of the recess 1b in the support. For cutting said bezel from the bar, I start from a bar of drawn brass the diameter of which should be accurate within an allowance of two microns and I reduce the portion of the bezel which surrounds the through-stone so as to form a collar so that its diameter is consequently not modified when the through-stone is urged into said portion. The surface 1d on the inner projection of the support may be accurately trued by stamping during its cutting from the bar or later on.

It will be readily understood that it is possible to substitute for the bezel and through-stone arrangement of Fig. 9, the corresponding arrangement shown in Fig. 3 without any recess being provided for housing the through-stone; the bezel would consequently be centered in the bearing support with the frustoconical surface of its collar engaging the bevelled edge of a recess or a mere cylindrical opening formed in the support. It would be urged into position by the pressure exerted by the flange which acts, through the bezel of the end-stone, with which it is rigid, on the bezel of the through-stone.

The through-stone associated with its bezel may of course be made of stone or of any other suitable material such as metal and it may also be formed as a unit with its bezel.

The bezel of the end-stone may assume the shape of a cap the bottom of which is thin and it may be made of some solid non-metallic transparent elastically deformable material to which the flange may be secured in any of the above disclosed manners; it may also be colored or otherwise treated and it may be made of the material sold under the name Plexiglas.

The through-stone and also the unitary bezel and through-stone member referred to may be made of such a synthetic material or of any other solid similar non-metallic material such as that sold under the name "Kel-F."

Obviously, the flange may also be fitted through its outer projections inside a groove formed in a section of the bearing support housed in a recess formed in the plate of the clockwork, said support section assuming a larger diameter than the coaxial section fitted in the opening of said plate. When this manner of executing the bearing is possible, it is expedient to still further enlarge the flange and consequently also the abutment section of the bearing.

The inner diametrical notches 10 formed in the flange may be replaced by radial tongues and it would be easy in such a case to make the flange turn by means of two surfaces formed on a wooden peg by giving the end of said peg a rectangular cross-section associated with a central recess or by means of a similarly shaped tool provided with two diametrical slots adapted to be engaged by said tongues.

What I claim is:

1. A bearing for a revoluble clockwork member, comprising an annular support provided with a central bore, with two diametrically opposed arcuate passageways extending in a plane perpendicular to the axis of the bore and communicating with the latter throughout their length and opening at one end into an outer transverse surface of the support, and with recesses opening laterally into the opposite ends of said passageways, a through-stone carried inside said bore, an endstone carried by the support on the outside of said through-stone, an annular spring flange including four projections spaced at 90° from one another, of which two diametrically opposed projections extend outwardly and are adapted to enter said passageways and to engage the recesses in the support and the two other diametrically opposed projections are directed inwardly and engage the peripheral section of the endstone system to urge the latter into position towards the through-stone, the inner periphery of the annular spring flange between the two last mentioned projections lying outwardly of the endstone system and leaving a gap between it and the said endstone system.

2. A bearing for a revoluble clockwork member, comprising an annular support provided with a central bore, with two diametrically opposed arcuate passageways extending in a plane perpendicular to the axis of the bore, communicating with the latter throughout their length and opening at one end into an outer transverse surface of the support, and with recesses opening laterally in the opposite ends of said passageways, a through-stone axially movable with reference to the bore in the support and fitted therein with a very slight radial clearance, an endstone and a bezel inside which the latter is rigidly held, said bezel being mounted on the support on the outside of the said through-stone, an annular spring flange including four projections spaced at 90° from one another, of which two diametrically opposed projections extend outwardly and are adapted to enter said passageways and to engage the recesses in the support and the two other diametrically opposed projections are directed inwardly and engage the peripheral section of the endstone bezel to urge the latter into position towards the through-stone, the inner periphery of the annular spring flange between the two last mentioned projections lying outwardly of the endstone bezel and leaving a gap between it and the said endstone bezel.

3. A bearing for a revoluble clockwork member, comprising an annular support provided with a central bore, with two diametrically opposed arcuate passageways extending in a plane perpendicular to the axis of the bore, communicating with the latter throughout their length and opening at one end into an outer transverse surface of the support, and with recesses opening laterally in the opposite ends of said passageways, a through-stone axially movable with reference to the bore in the support and fitted therein with a very slight radial clearance, an endstone and a bezel inside which the latter is rigidly held, said bezel being carried by the support on the outside of said throughstone, an annular spring flange including four projections spaced at 90° from one another, of which two diametrically opposed projections extend outwardly and are adapted to enter said passageways and to engage the recesses in the support and the two other diametrically opposed projections are directed inwardly and engage the peripheral section of the endstone bezel to urge the latter into position towards the through-stone, the inner periphery of the annular spring flange between the two last mentioned projections lying outwardly of the endstone bezel and leaving a gap between it and the said endstone bezel and the outer periphery of the spring flange between the first mentioned outer projections thereon fitting with a slight clearance inside the section of the support registering with said flange.

4. A bearing for a revoluble clockwork member, comprising an annular support provided with a central bore the outer edge of which is bevelled, with two diametrically opposed arcuate passageways extending in a plane perpendicular to the axis of the bore, communicating with the latter throughout their length and opening at one end into an outer transverse surface of the support, and with recesses opening laterally into the opposite ends of said passageways, a throughstone carried inside said bore and including a collar having an outer frustoconical surface engaging the bevelled edge of the bore in the support, an endstone system carried by the support on the outside of said throughstone, an annular spring flange including four projections spaced at 90° from one another, of which two diametrically opposed projections extend outwardly and are adapted to enter said passageways and to engage the recesses in the support and the two other diametrically opposed projections are directed inwardly and engage the peripheral section of the endstone system to urge the latter into position towards the throughstone, the inner periphery of the annular spring flange between the two last mentioned projections lying outwardly of the endstone system and leaving a gap between it and the said endstone system.

5. A bearing for a revoluble clockwork member, comprising an annular support provided with a central bore, with two diametrically opposed arcuate passageways extending in a plane perpendicular to the axis of the bore, communicating with the latter throughout their length and opening at one end into an outer transverse surface of the support, and with recesses opening laterally in the opposite ends of said passageways, a throughstone axially movable with reference to the bore in the support and fitted with a very slight radial clearance, an endstone and a bezel inside which the latter is rigidly held and including an outwardly grooved peripheral collar, said bezel being carried by the support on the outside of the said throughstone, an annular spring flange including four projections spaced at 90° from one another, of which two diametrically opposed projections extend outwardly and are adapted to enter said passageways and to engage the recesses in the support and the two other diametrically opposed projections are directed inwardly and engage the groove in the bezel collar to urge the latter into position towards the throughstone, the inner periphery of the annular spring flange between the two last mentioned projections lying outwardly of the endstone bezel and leaving a gap between it and the said endstone bezel.

6. A bearing for a revoluble clockwork member, comprising an annular support provided with a central bore, with two diametrically opposed arcuate passageways extending in a plane perpendicular to the axis of the bore, communicating with the latter through their length and opening at one end into an outer transverse surface of the support, and with recesses opening laterally in the opposite ends of said passageways, a throughstone axially movable with reference to the bore in the support and fitted therein with a very slight radial clearance, an endstone and a bezel inside which the latter is rigidly held, said bezel being carried by the support on the outside of the said throughstone, an annular spring flange including two diametrically opposed projections extending outwardly and adapted to enter said passageways and to engage the recesses in the support and two other diametrically opposed projections directed inwardly and engaging the peripheral section of the endstone bezel to urge the latter into position towards the throughstone, the inner periphery of the annular spring flange between the two last mentioned projections lying outwardly of the endstone bezel and leaving a gap between it and the said endstone bezel and the outer periphery of the annular spring flange between the two first mentioned projections leaving a small clearance between it and the inner wall of the bore in the support.

7. A bearing for a revoluble clockwork member, comprising an annular support provided with a central bore, with two diametrically opposed arcuate passageways extending in a plane perpendicular to the axis of the bore and opening into the latter throughout their length and opening at one end into an outer transverse surface of the support, and with recesses opening laterally in the opposite ends of said passageways, a throughstone inserted with a tight fit in the bore in the support, an endstone and a bezel inside which the latter is rigidly held, said bezel being carried by the support on the outside of said throughstone, an annular spring flange including two diametrically opposed projections extending outwardly and adapted to enter said passageways and engaging the recesses in the support and two other diametrically opposed projections directed inwardly and engaging the peripheral section of the endstone bezel to urge the latter into position towards the throughstone, the inner periphery of the annular spring flange between the two last mentioned projections lying outwardly of the endstone bezel and leaving a gap between it and the said endstone bezel and the outer periphery of the annular spring flange between the two first mentioned projections leaving a small clearance between it and the inner wall of the bore in the support.

8. A bearing for a revoluble clockwork member, comprising an annular support provided with a central bore, with two diametrically opposed arcuate passageways extending in a plane perpendicular to the axis of the bore and opening into the latter throughout their length and opening at one end into an outer transverse surface of the support, and with recesses opening laterally in the opposite ends of said passageways, a throughstone axially movable with reference to the bore in the support and fitted with a very slight radial clearance, an endstone carried by the support on the outside of said throughstone and provided with an outer peripheral groove, an annular spring flange including two diametrically opposed projections extending outwardly and adapted to enter said passageways and engaging the recesses in the support and two other diametrically opposed projections directed inwardly and engaging the peripheral groove of the endstone to urge the latter into position towards the throughstone, the inner periphery of the annular spring flange between the two last mentioned projections lying outwardly of the endstone and leaving a gap between it and the said endstone and the outer periphery of the annular spring flange between the two first mentioned projections leaving a small clearance between it and the inner wall of the bore in the support.

9. A bearing for a revoluble clockwork member, comprising an annular support provided with a central bore, with an opening the bottom of which extends on the outside of said bore, two diametrically opposed arcuate passageways extending in a plane perpendicular to the axis of the bore, communicating with the coaxial opening throughout their length and opening at one end into outer transverse surface of the support, and with recesses opening laterally into the opposite ends of said passageways, a throughstone inserted with a tight fit in the bore in the support, an endstone and a bezel inside which the latter is rigidly held, said bezel being carried by the bottom of the opening in the support on the outside of the throughstone, an annular spring flange including two diametrically opposed projections extending outwardly and adapted to enter said passageways and engaging the recesses in the support and two other diametrically opposed projections directed inwardly and engaging the peripheral section of the endstone bezel to urge the latter into position towards the throughstone, the inner periphery of the annular spring flange between the two last mentioned projections lying outwardly of the endstone bezel and leaving a gap between it and the said endstone bezel and the outer periphery of the annular spring flange between the two first mentioned projections leaving a small clearance between it and the inner wall of the opening in the support.

10. A bearing for a revoluble clockwork member, comprising an annular support provided with a central bore, with two diametrically opposed arcuate passageways extending in a plane perpendicular to the axis of the bore, communicating with the latter throughout their length and opening at one end into an outer transverse surface of the support, and with recesses opening laterally in the opposite ends of said passageways, a throughstone axially movable with reference to the bore in the support and fitted therein with a very slight radial clearance, an endstone and a bezel inside which the latter is rigidly held, said bezel being carried by the support on the outside of the said throughstone, an annular spring flange including two diametrically opposed projections extending outwardly and adapted to enter said passageways and to engage the recesses in the support and two other diametrically opposed projections directed inwardly and rigid with the peripheral section of the endstone bezel to urge the latter into position towards the throughstone, the inner periphery of the annular spring flange between the two last mentioned projections lying outwardly of the endstone bezel and leaving a gap between it and the said endstone bezel and the outer periphery of the annular spring flange between the two first mentioned projections leaving a small clearance between it and the inner wall of the bore in the support.

11. A bearing for a revoluble clockwork member, comprising an annular support provided with a central bore, with two diametrically opposed arcuate passageways extending in a plane perpendicular to the axis of the bore to connect the latter with the outer periphery of the support and opening at one end into an outer transverse surface of the support, a throughstone axially movable with reference to the bore in the support and fitted therein with a very slight radial clearance, an endstone and a bezel inside which the latter is rigidly held, said bezel being carried by the support on the outside of the said throughstone, an annular spring flange including two diametrically opposed projections extending outwardly and adapted to enter said passageways and to engage the passageways in the support up to substantial register with the outer surface of the latter and two other diametrically opposed projections directed inwardly and engaging the peripheral section of the endstone bezel to urge the latter into position towards the throughstone, the inner periphery of the annular spring flange between the two last mentioned projections lying outwardly of the endstone bezel and leaving a gap between it and the said endstone bezel and the outer periphery of the annular spring flange between the two first mentioned projections leaving a small clearance between it and the inner wall of the bore in the support.

12. A bearing for a revolvable clockwork member comprising a perforated section and an abutment section, a support having a cylindrical outer surface and being adapted to be received in a cylindrical opening in a portion of a movement-carrying structure, said support having a stepped coaxial recess receiving said bearing sections, two diametrically opposed openings extending radially outwardly from said recess and coaxial passages extending circumferentially from said openings, an annular elastic flange surrounding the abutment section and having one outer and one inner pair of diametrically opposed arcuate projections, the outer periphery of said outer projections having substantially the same diameter as said cylindrical opening, thus permitting the use of bearing sections of maximum diameter, said inner projections securing said flange to said abutment section at least in an axial direction, said flange being received with slight radial clearance in said recess of the support and said outer projections of the flange being received in said opposed openings so that by applying pressure in an axial direction on said outer projections followed by a rotary motion, said outer projections are inserted in said coaxial passages of the support and bear against the adjacent surfaces of said passages, said flange being thereby flexed and securing at least the abutment section of the bearing resiliently in said recess.

References Cited in the file of this patent

UNITED STATES PATENTS

| 448,896 | Villon | Mar. 24, 1891 |
| 2,316,920 | Webber | Apr. 20, 1943 |
| 2,405,892 | Lederer | Aug. 13, 1946 |

FOREIGN PATENTS

| 745,663 | France | Feb. 21, 1933 |
| 198,992 | Switzerland | Oct. 1, 1938 |
| 645,531 | Great Britain | Nov. 1, 1950 |
| 984,582 | France | Feb. 28, 1951 |
| 281,031 | Switzerland | June 3, 1952 |
| 283,486 | Switzerland | Oct. 1, 1952 |